United States Patent
Bruich et al.

(10) Patent No.: US 9,332,042 B2
(45) Date of Patent: May 3, 2016

(54) PROVIDING USER METRICS FOR AN UNKNOWN DIMENSION TO AN EXTERNAL SYSTEM

(71) Applicant: Facebook, Inc., Menlo Park, CA (US)

(72) Inventors: Sean Michael Bruich, Palo Alto, CA (US); Frederick Ross Leach, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 305 days.

(21) Appl. No.: 13/632,985

(22) Filed: Oct. 1, 2012

(65) Prior Publication Data

US 2013/0086169 A1    Apr. 4, 2013

Related U.S. Application Data

(60) Provisional application No. 61/542,692, filed on Oct. 3, 2011.

(51) Int. Cl.
*H04L 29/06* (2006.01)
*H04L 29/08* (2006.01)

(52) U.S. Cl.
CPC ........... *H04L 65/40* (2013.01); *H04L 67/02* (2013.01); *H04L 67/306* (2013.01); *H04L 29/06* (2013.01)

(58) Field of Classification Search
CPC combination set(s) only.
See application file for complete search history.

(56) References Cited

U.S. PATENT DOCUMENTS

| | | | |
|---|---|---|---|
| 5,729,228 A * | 3/1998 | Franaszek et al. | 341/106 |
| 6,236,341 B1 * | 5/2001 | Dorward et al. | 341/60 |
| 6,393,422 B1 * | 5/2002 | Wone | |
| 7,240,022 B1 * | 7/2007 | Bistriceanu et al. | 705/14.19 |
| 2005/0055437 A1 * | 3/2005 | Burckart et al. | 709/224 |
| 2008/0091685 A1 * | 4/2008 | Garg et al. | 707/10 |
| 2009/0006180 A1 * | 1/2009 | Hameen-Anttila | 705/10 |
| 2010/0274815 A1 | 10/2010 | Vanasco | |
| 2011/0107190 A1 * | 5/2011 | Henderson et al. | 714/798 |
| 2011/0113086 A1 * | 5/2011 | Long et al. | 709/203 |
| 2011/0173264 A1 | 7/2011 | Kelly | |
| 2011/0231240 A1 | 9/2011 | Schoen et al. | |
| 2012/0011432 A1 * | 1/2012 | Strutton | 715/234 |
| 2012/0239809 A1 * | 9/2012 | Mazumdar et al. | 709/224 |
| 2012/0290953 A1 * | 11/2012 | Russell et al. | 715/758 |

OTHER PUBLICATIONS

PCT International Search Report and Written Opinion, PCT Application No. PCT/US2012/058342, Dec. 17, 2012, nine pages.

* cited by examiner

*Primary Examiner* — Chris Parry
*Assistant Examiner* — Caroline Jahnige
(74) *Attorney, Agent, or Firm* — Fenwick & West LLP

(57) ABSTRACT

A social networking system may provide user metrics for unknown dimensions to an external system using received hash codes from user devices performing actions on the external system. Embodiments of the invention receive hash codes generated by external systems that are embedded in redirect Uniform Resource Locators (URLs) that are executed by user devices. The social networking system may match the received hash codes to identifying information about users, e.g., user identifiers. The user profile information may be reported to external systems based on hash codes in an aggregated format without disclosing identifying information about users. In one embodiment, a hash code may include identifying information of an administrator of an external system to enable the administrator to merge information about users of the social networking system with other unknown dimensions of information about the users that is known by the external system.

29 Claims, 3 Drawing Sheets

US 9,332,042 B2

PROVIDING USER METRICS FOR AN UNKNOWN DIMENSION TO AN EXTERNAL SYSTEM

CROSS REFERENCE TO RELATED APPLICATIONS

This application is a conversion of Provisional U.S. Application No. 61/542,692, filed Oct. 3, 2011, which is incorporated by reference in its entirety.

BACKGROUND

This invention relates generally to social networking, and in particular to providing user metrics for an unknown dimension to an external system.

Traditional advertisers have used focus groups and demographic data to gain an understanding of how to design and implement effective ad campaigns. For example, a sports drink advertiser may use a random sampling of a target population, such as 18-35 year-old men, to determine whether an ad would be effective. An advertisement is then presented to thousands, or even millions of people, but advertisers may be left wondering how different sets of consumers are responding to the advertisement. As a result, information about the population of users that responded to the advertisement cannot be obtained through traditional methods.

In recent years, social networking systems have made it easier for users to share their interests and preferences in real-world concepts, such as their favorite movies, musicians, celebrities, brands, hobbies, sports teams, and activities. These interests may be declared by users in user profiles and may also be inferred by social networking systems. Users can also interact with these real-world concepts through multiple communication channels on social networking systems, including interacting with pages on the social networking system, sharing interesting articles about causes and issues with other users on the social networking system, and commenting on actions generated by other users on objects external to the social networking system. Although advertisers may have some demographics information about users who are interested in their brands, this information is often incomplete or based on samples of aggregated data.

Specifically, users that perform actions on external systems, such as expressing an interest in a specific type of new car, or clicking through an application to buy shoes, are only identifiable by external systems through non-person level mechanisms such as cookies or browsers that are not able to be tied to the actual people performing the actions. A social networking system, on the other hand, is able to identify people and may record information about users that is valuable to administrators of external systems, such as prior ad exposure, other interests, and connectedness among other users of the social networking system. The social networking system may also have the ability to track user actions that are performed on external systems. However, existing systems have not provided efficient mechanisms of providing user metrics on these user actions without compromising the privacy and anonymity of its users. Tools are needed to provide advertisers with useful information about users without sacrificing the privacy and anonymity of users the social networking system.

SUMMARY

A social networking system may provide user metrics for unknown dimensions to an external system using received hash codes from user devices that have performed actions on the external system. For example, when user devices perform an action for which the external system would like to obtain metrics, the external system provides the user devices with a redirect Uniform Resource Locator (URL) that is then executed by the user device. The redirect URL causes the user devices to request a web page from the social networking system. The external system may embed one or more hash codes or other encoded information in the redirect URL and thereby pass information to the social networking system in connection with each particular user device. The hash codes may include a code for an action for which metrics are sought (e.g., that the user indicated a desire to purchase a particular product) that is known to the external system, but may be unknown to the social networking system. These unknown dimensions of information, or the codes for the action for which metrics are sought by the external system, may be stored in the social networking system in association with the user associated with the user device. The social networking system may identify the users using a user login or a stored cookie for the user on the user device to match the user with a user account for the social networking system. In one embodiment, a hash code may include identifying information of an administrator of an external system to enable the administrator to merge information about users of the social networking system with other unknown dimensions of information about the users from the perspective of the social networking system that is known by the external system, such as whether the user performed a certain series of actions on the external system.

Once it receives sufficient information to prepare a report of user metrics, the social networking system then aggregates the information for multiple users according to one or more dimensions of information that the social networking system tracks but that may not be tracked by the external system (such as age, gender, or educational level). The social networking system may also aggregate the encoded user information for the unknown dimensions that were passed to the social networking system in the redirect URLs. The resulting user metrics may then be reported by the social networking system back to the external system in an aggregated format, where the unknown dimensions are reported using the hash codes. Since the metrics reported to the external system are aggregated, the social networking system will not share any personally identifiable information for any individual user. Moreover, since the information received by the social networking system for the unknown dimensions is encoded, from receipt to reporting of metrics, the external system need not share with the social networking system the personal information that it collects about the users.

Figure 1:
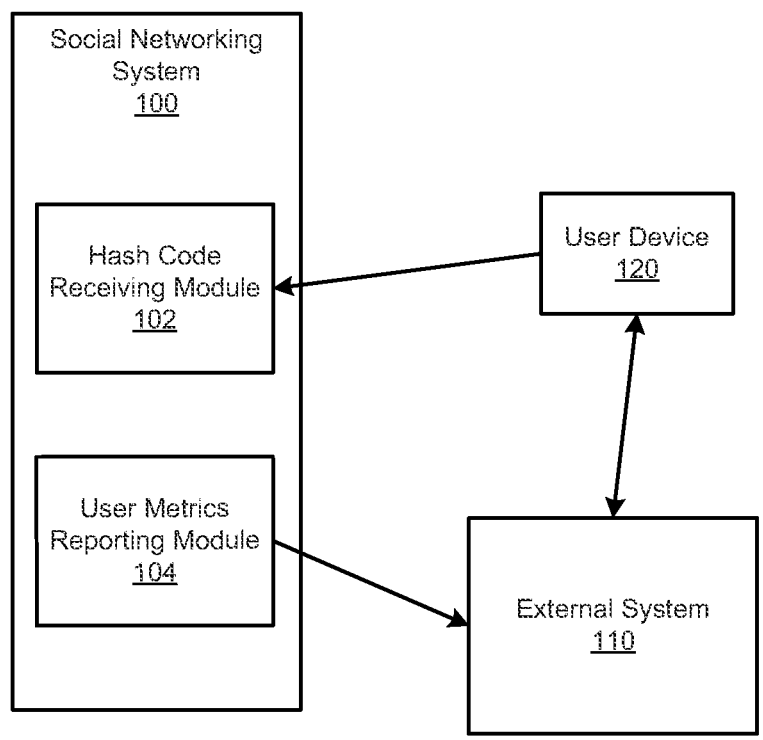
FIG. 1 is high level block diagram illustrating a process of providing user metrics for an unknown dimension to an external system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. Each of the interactions with an object may be recorded by the social networking system as an edge. Enabling third-party developers to define custom object types and custom action types is described further in "Structured Objects and Actions on a Social Networking System," U.S. application Ser. No. 13/239,340 filed on Sep. 21, 2011, which is hereby incorporated by reference.

Users of the social networking system may perform numerous actions on external systems, such as clicking on links, searching through the website, viewing content, posting comments, interacting with applications, purchasing products using a credit card, and other transactions. For example, an external system may include a car manufacturer's website where users may view photos, engage in simulations, watch videos, and customize a car with various options. An administrator of an external system may track information about users of the external system, but the information may be limited to Internet Protocol addresses and tracking cookies. In order to gain a better understanding of its audience, the administrator of the external system may generate a hash code for various actions and information known to the administrator of the external system but unknown to the social networking system.

Returning to the previous example, the car manufacturer's website may request information about a user that has created an appointment for a test drive, including a zip code. An administrator of the car manufacturer's website may wish to track users by zip code that have created an appointment for a test drive. A hash code may be generated upon users completing the appointment form for the test drive by the external system. Embedded in the hash code may be a dimension for the zip code of the user, in one embodiment. This dimension may be unknown to the social networking system that receives the hash code through a redirect URL sent by the external system to the user device completing the appointment form on the external system.

A social networking system, upon receiving the hash code from the user device, may parse the hash code according to a scheme that was previously shared by the administrator of the external system, in one embodiment. In another embodiment, the hash code may be stored in the social networking system in association with the user that is associated with the user device.

FIG. 1 illustrates a high level block diagram of a process of providing user metrics for an unknown dimension to an external system, in one embodiment. The social networking system 100 includes a hash code receiving module 102 and a user metrics reporting module 104. A user device 120 may communicate with an external system 110 to perform an action on the external system 110, such as creating an appointment for a test drive at a local car dealer, purchasing a book about Darwin, listening to a new remix of Britney Spears's song "I Wanna Go" being streamed by other users, as well as any other real-world interaction that may be performed on an external system 110. The external system 110 may embed a hash code within a redirect Uniform Resource Locator (URL) that is embedded within a link that is associated with an action that is being tracked, such as a "Submit" button on the application to create a test drive appointment, for example. The user device 120 then provides the social networking system 100 with the embedded hash code as a result of the redirect URL that points the user device 120 to the social networking system 100, in one embodiment.

The hash code may be an alphanumeric string of characters, in one embodiment. In another embodiment, the hash code may include a series of bits that may be parsed by the social networking system 100. The hash code may represent the action being performed on the external system, such as clicking the "Submit" button on an application to create a test drive appointment at a local dealer, for example. In another embodiment, the hash code may include identifying information about the administrator of the external system, such as an email address. In a further embodiment, the redirect URL does not include a hash code. In this case, the social networking system 100 may provide a specific URL for the particular external system to report metrics on a single unknown dimension. In yet another embodiment, the hash code may include more than one dimension, such as age range, zip code, and income, in addition to a code for the type of action that was performed. For example, if it is known that the user clicking the "Submit" button on the test drive appointment application is located in the zip code 94040 and is within the age group of 18-35 year olds, then that information may be encoded as separate dimensions in the hash code. For illustration purposes, a sample hash code may be "94040001123" where the first 5 characters represent the zip code, "94040," the next three characters represent the age group, "001," and the final three characters represent the action being tracked, "123."

After the hash code is received by the social networking system 100, the hash code receiving module 102 processes the hash code. The hash code is associated with a user identifier for the user associated with the user device 120. In one embodiment, the social networking system 100 stores an object for each hash code for an action performed on the external system 110. Returning to the previous example, the social networking system 100 may store an object for the hash code "123" and associated the user identifier associated with the user device 120 with that object for the hash code "123." In another embodiment, where there is no hash code, the social networking system 100 associates the user identifier associated with the user device 120 with an object for the external system 110 that is stored in the social networking system 100.

In yet another embodiment, where identifying information of the administrator of the external system 110 is included in the hash code received by the social networking system 100, an object for hash code may be generated by the social networking system 100. For example, the social networking system 100 may enable any third-party developer to track user metrics including unknown dimensions for actions performed on external systems. The social networking system 100 may generate a hash code that includes the email address of the third-party developer and a code for the action being tracked. For example, a sample hash code may be "jon@example.com001" where the last three characters represent the hash code of the action being tracked and the remainder of the hash code represents the email address of the third-party developer. In this way, the social networking system 100 may provide metrics that can be tracked for any external system. These metrics may be sold to third-party developers seeking to gain a better understanding of the users that interact with their external systems.

In one embodiment, the user metrics reporting module 104 must receive a predetermined threshold number of hash codes before aggregating user profile information of the users that are associated with the user devices 120 that provided the hash codes and providing the aggregated user profile information to the external system 110. This prevents administrators of the external system 110 from associating the user profile information with the user devices 120 that accessed the external system 110 to perform the actions being tracked. The user profile information is aggregated by hash code. For example, the user metrics reporting module 104 may aggregate user profile information about the users that are associated with the hash code "123." The user profile information may include various types of information that is available on the social networking system 100, including basic demographics information such as age, gender, interests, and location. The aggregated user profile information may also include more sophisticated analysis, such as social graph information. Social graph information may include an analysis of the connectedness of the users that performed the action on the external system 110. For example, the user metrics reporting module 104 may report that 25% of the users performing the action on the external system 110 are either directly or indirectly connected in the social networking system 100. The user metrics reporting module 104 may include other information available on the social networking system 100 with respect to users, such as the number of "likes," or expressions of interest, on the social networking system 100, the number of posts made in the last week, the level of engagement shown by the user with respect to interacting with other users and applications on the social networking system 100, the average amount of time spent on the social networking system 100, and the like.

The user metrics reporting module 104 provides the user profile information and other user metrics information to the external system 110 aggregated by hash code, in one embodiment. In another embodiment in which a hash code was not embedded in the redirect URL, the user profile information and other user metrics information associated with the external system 110 is provided to the external system 110. The external system 110 may then merge the user profile information with other information about users that it maintained internally to gain a better understanding of the users that perform actions on the external system 110. For example, the external system 110 may discover that the majority of users that performed the action have also expressed an interest, or have "liked" a page on the social networking system 100, associated with the brand of the external system 110. The social networking system 100 may not be made aware of the action being performed, or series of actions being performed, on the external system 110. This enables third-party developers to obtain more information about users of the social networking system 100 that perform actions on the external system 110 without revealing the dimension of information being measured.

In a further embodiment, a third-party developer of an external system 110 may use a redirect URL to pass along a polling question that was posed to a user and the responses to the polling question. A URL and an identifier of a question, such as "Do you approve of President Obama?" may be packed in the redirect URL without revealing the content of the question to the social networking system 100 because the identifier of the question may not reveal the question being asked, such as "XY." Answer values provided by the user device 120 may also be embedded in the redirect URL, such as "XY1" and "XY2," that do not reveal the answers provided by users. In this case, "XY1" may represent a user's response as "Yes, I approve of President Obama," while "XY2" may represent a user's response as "No, I do not approve of President Obama." The social networking system 100 may then provide back to the external system 110 the answers grouped by age, gender, education, or whether the user expressed an interest in President Obama's page on the social networking system, depending on the type of information requested by the external system 110. The answers, encoded as "XY1" and "XY2," do not reveal how a user answered because the answers are hashed. In this way, pollsters and other survey systems may obtain more information through one or more reports about the responders to polls and surveys in an aggregated format.

System Architecture

Figure 2:
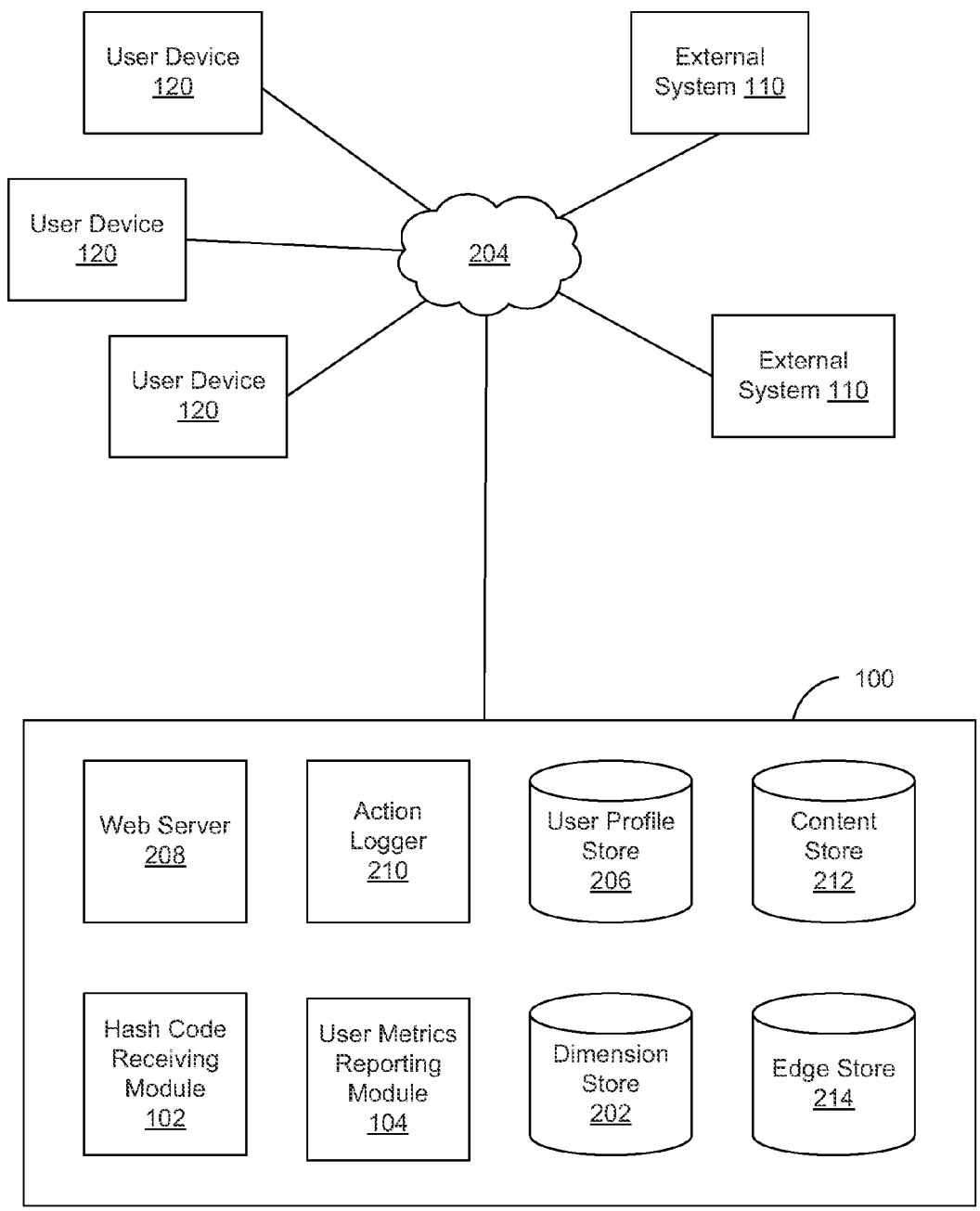
FIG. 2 is a network diagram of a system for providing user metrics for an unknown dimension to an external system, showing a block diagram of the social networking system, in accordance with an embodiment of the invention.

FIG. 2 is a high level block diagram illustrating a system environment suitable for enabling preference portability for users of a social networking system, in accordance with an embodiment of the invention. The system environment comprises one or more user devices 120, the social networking system 100, a network 204, and external systems 110. In alternative configurations, different and/or additional modules can be included in the system.

The user devices 120 comprise one or more computing devices that can receive user input and can transmit and receive data via the network 204. In one embodiment, the user device 120 is a conventional computer system executing, for example, a Microsoft Windows-compatible operating system (OS), Apple OS X, and/or a Linux distribution. In another embodiment, the user device 120 can be a device having computer functionality, such as a personal digital assistant (PDA), mobile telephone, smart-phone, etc. The user device 120 is configured to communicate via network 204. The user device 120 can execute an application, for example, a browser application that allows a user of the user device 120 to interact with the social networking system 100. In another embodiment, the user device 120 interacts with the social networking system 100 through an application programming interface (API) that runs on the native operating system of the user device 120, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3 G, 4 G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a hash code receiving module 102, a user metrics reporting module 104, a web server 208, an action logger 210, a content store 212, an edge store 214, and dimension store 202. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 120; the web server 208 serves web pages, as well as other web-related content, such as Java, Flash, XML, and so forth. The web server 208 may provide the functionality of receiving and routing messages between the social networking system 100 and the user devices 120, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

The action logger 210 is capable of receiving communications from the web server 208 about user actions on and/or off the social networking system 100. The action logger 210 populates an action log with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

An action log may be used by a social networking system 100 to track users' actions on the social networking system 100 as well as external websites that communication information back to the social networking system 100. As mentioned above, users may interact with various objects on the social networking system 100, including commenting on posts, sharing links, and checking-in to physical locations via a mobile device. The action log may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log records data about these users, including viewing histories, advertisements that were clicked on, purchasing activity, and buying patterns.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 214, in one embodiment. For example, a user that plays multiple songs from Lady Gaga's album, "Born This Way," may have multiple edge objects for the songs, but only one edge object for Lady Gaga.

A hash code receiving module 102 processes the hash code received from the user device 120 that is embedded in the redirect URL provided to the user device 120 by the external system 110. In one embodiment, a user metrics reporting module 104 provides aggregated user profile information and other user metrics available on the social networking system 100 by hash code to the external system 110 associated with the hash code after a predetermined threshold number of hash codes have been received by the hash code receiving module 102. In another embodiment, the user metrics reporting module 104 provides the aggregated user profile information and other user metrics available on the social networking system 100 by hash code to the external system 110 upon request, provided that the predetermined threshold number of hash codes has been received by the social networking system 100.

In one embodiment, hash codes are parsed into unknown dimensions according to formats for the hash codes. The unknown dimensions may be stored as dimension objects in a dimension store 202 in the social networking system 100. The external system 110 may generate hash code objects through an interface with the social networking system 100, in one embodiment. In another embodiment, the social networking system 100 generates hash code objects based on information provided by the external system 110, including how to process the hash codes extracted from the redirect URLs. For example, a third-party developer of the external system 110 may indicate that the last three characters of a hash code represent the action, or unknown dimension, being tracked by the social networking system 100. In another example, a hash code may include several unknown dimensions that are being tracked by the social networking system 100, such as the first two characters of the hash code and the last five characters of the hash code. These unknown dimensions may be stored as dimension objects in the dimension store 202.

A user metrics reporting module 104 may provide one or more reports to the external system 110 that includes aggregated user profile information and other user metrics available on the social networking system 100 by hash code. Hash codes may be generated for demographics, poll questions and answers, as well as behavioral information of users on the social networking system 100, such as whether the user is associated with a mobile device, whether the user has clicked on advertisements, and what types of pages is the user associated with on the social networking system 100. Continuing a previous example, an external pollster system may request various information about users of the social networking system 100 that answered the question, "Do you approve of President Obama?" including aggregated information about the users' declared political affiliation in the social networking system 100, aggregated information about the users' interest in politics as a score determined by the social networking system 100, among other information items. In this example report, the hash code generated in the report to the external system 110 for the external pollster system may be in a particular format agreed to by administrators of the social networking system 100 and the external system 110, such as reserving the first two characters for the hash code that identifies the political party affiliation of the users responding to the polling question, the next four characters for the count of users with that political party affiliation responding to the polling question, and the next eight characters for demographic information (e.g., age, age-range, gender, location, etc.) about the users responding to the polling question. In one embodiment, a score determined by the social networking system 100 that gauges each responding user's interest in politics may be included in the hash code. In another embodiment, the scores may be grouped in ranges, providing more nuanced information about the users that were polled. The user metrics reporting module 104 may also provide aggregated user profile information and other user metrics available on the social networking system 100 by hash code to the external system 110 upon request. The format of the report may be user-defined based on types of aggregated user information selected by an administrator of the external system 110 through a user interface with the social networking system 100 or through an application programming interface (API), in one embodiment.

Figure 3:
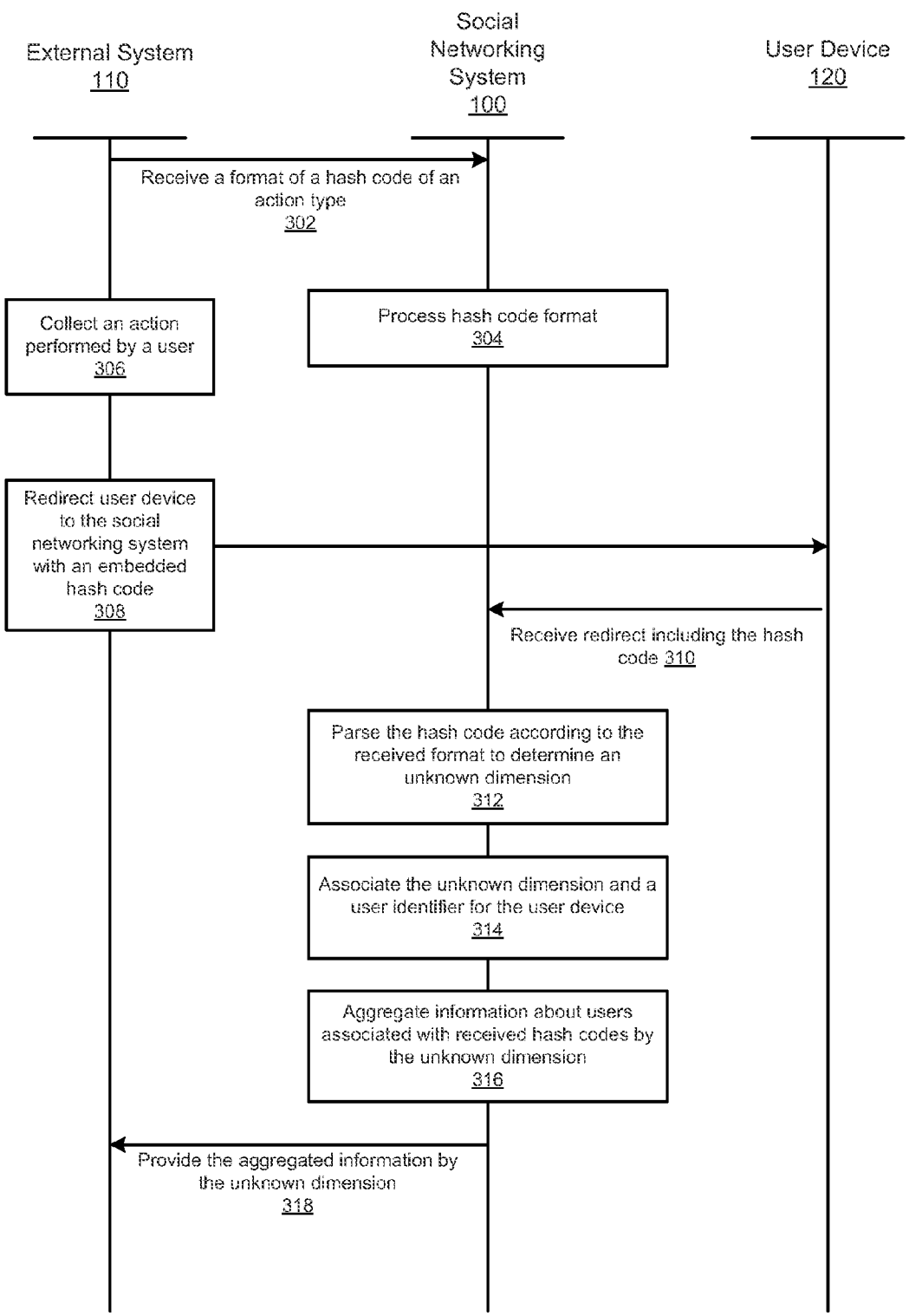
FIG. 3 is an interaction diagram illustrating how user metrics for an unknown dimension are provided to an external system, in accordance with an embodiment of the invention.

FIG. 3 illustrates an interaction diagram illustrating how user metrics are provided for an unknown dimension to an external system, in one embodiment. A format of a hash code of an action type is received 302 by the social networking system 100 from the external system 110. The social networking system 100 then processes 304 the hash code format. This may include a number of processes, such as identifying an object associated with the external system 110 that is associated with the hash code format, generating an object stored on the social networking system 100 for the hash code format, and identifying one or more unknown dimensions in the hash code format.

An action performed by a user is collected 306 by the external system 110. In one embodiment, the action performed by the user may include a series of actions, such as completing an application form for setting up a test drive appointment at a local car dealer. In another embodiment, the action performed by the user may include a click on a link or button, a search performed on the external system 110, a viewing of content on the external system 110, as well as real-world actions such as running a route, listening to a playlist of songs, and playing a gaming application. Other actions may include credit card transactions and purchases of products, such as airfare, shoes, and books.

The external system 110 may then redirect 308 a user device to the social networking system with an embedded hash code. In one embodiment, the user device 120 is redirected 308 using a redirect URL in which the hash code is embedded. In another embodiment, the external system 110 may redirect 308 the user device using an application programming interface (API) call in which the hash code is embedded. The social networking system 100 may receive 310 the redirect from the user device 120 that includes the embedded hash code.

The social networking system 100 may then parse 312 the embedded hash code according to the received format to determine an unknown dimension. In one embodiment, the embedded hash code may have several unknown dimensions as outlined in the received format. The unknown dimension is associated 314 with the user identifier for the user device 120 by the social networking system 100. This enables the social networking system 100 to track the user that exhibited the unknown dimension for reporting user profile information and other user metrics, in aggregate, to the external system 110.

After a predetermined threshold number of hash codes have been received by the social networking system 100, user profile information as well as other user metrics may be aggregated 316 by the unknown dimension. Known dimensions, such as age, gender, zip code, social graph information, likes, and other types of information available about users of the social networking system may be aggregated for the unknown dimension. For example, aggregated user profile information about users associated with an unknown dimension, "123," may include forty male users and sixty-eight female users, 10% of the total users may be directly or indirectly connected to each other, and the majority of the users may be interested in dance music. If there are multiple unknown dimensions embedded in a hash code, user profile information and other user metrics about users associated with each unknown dimension are separately aggregated 316, in one embodiment. The aggregated information is then provided 318 to the external system 110 by the unknown dimension. In an embodiment where no hash code is embedded in the redirect, the user profile information and other user metrics for users associated with the external system 110 are provided 318 to the external system 110.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by an online system, a plurality of requests for a web page associated with an external system, at least portion of the plurality of requests being from a plurality of users of the online system that are identifiable via a redirect URL provided by the external system, the redirect URL containing encoded information for an unknown user dimension for each user of the plurality of users, where values of the unknown user dimension are obfuscated by the external system to be unknown to the online system, each user of the plurality of users being associated with a particular value of the unknown user dimension that is different relative to at least one other user of the plurality of users;
extracting, by a processor, obfuscated values of the unknown user dimension from a plurality of the redirect URLs;
determining, for the plurality of requests, user identifiers based at least in part on user devices associated with the plurality of requests, the user identifiers corresponding to user profiles with the online system;
storing, for each of the plurality of requests, a user identifier with an obfuscated value of the unknown user dimension;
determining, based on the user identifiers, user information from the user profiles for the plurality of users;
aggregating the user information with the obfuscated values of the unknown user dimension;
generating, by the processor, a user metrics report based on the aggregated user information; and
providing the user metrics report to the external system.

2. The method of claim 1, further comprising:
extracting the unknown user dimension from a plurality of the redirect URLs, the extracted unknown user dimension comprising an encoded value for the unknown user dimension.

3. The method of claim 2, wherein the user metrics report comprises an aggregation of user profile information stored by the online system and user information extracted from the plurality of redirect URLs.

4. The method of claim 2, wherein the user information extracted from the plurality of redirect URLs is identified in the metrics report based on the encoded values extracted from the redirect URLs.

5. The method of claim 2, wherein the extracted information is encoded.

6. The method of claim 2, wherein the values of the extracted unknown user dimension comprises a hash code.

7. The method of claim 1, wherein the aggregated user profile information comprises information about one or more connections that the users have established in the social networking system.

8. The method of claim 1, wherein determining user profile information about the plurality of users further comprises obtaining identifiers for the users from cookies stored on the users' devices.

9. The method of claim 1, wherein aggregating the user profile information based on the unknown user dimension further comprises:
generating the user profile information based on a retrieved format of the user metrics report; and for the plurality of users, determining a count for each of the values of the unknown user dimension.

10. The method of claim 9, wherein the format of the user metrics report is retrieved from an object stored in the online system.

11. The method of claim 9, wherein the format of the user metrics report is retrieved from the external system.

12. The method of claim 9, wherein the format of the user metrics report is encoded in a redirect URL of the received plurality of redirect URLs.

13. The method of claim 1, wherein the aggregated user profile information comprises information about one or more determined scores associated with the users for an interest in the online system.

14. The method of claim 1, wherein the aggregated user profile information comprises information about one or more determined scores associated with the users for an affiliation in the online system.

15. The method of claim 1, wherein the aggregated user profile information comprises information about one or more determined scores associated with the users for a concept in the online system.

16. A method comprising:
receiving, by an online system, a plurality of requests for a web page of an external system, each of the plurality of requests identified by a redirect URL from a plurality of users of the online system, the redirect URL containing encoded information for an unknown user dimension for each user of the plurality of users, where values of the unknown user dimension are obfuscated by the external system to be unknown to the online system, each user of the plurality of users being associated with a particular value of the unknown user dimension that is different relative to at least one other user of the plurality of users;
determining, for each of the plurality of requests, one or more unknown user dimensions encoded in a plurality of the redirect URLs based on a format of the redirect URL received from the external system tracking the one or more unknown user dimensions;
extracting, by a processor, the obfuscated values of the unknown user dimension from the plurality of the redirect URLs;
determining, for each of the plurality of requests, user identifiers based at least in part on user devices associated with the plurality of requests, the user identifiers corresponding to user profiles with the online system;
determining, based on the user identifiers, user information from the user profiles;
aggregating the user information with the obfuscated values of the unknown user dimension;
generating a user metrics report comprising the aggregated user profile information and the obfuscated values of the unknown user dimension in the plurality of redirect URLs; and
providing the user metrics report to the external system.

17. The method of claim 16, further comprising:
storing the one or more unknown dimensions about the plurality of users in the online system.

18. The method of claim 16, wherein the format of the redirect URL comprises one or more positions of the one or more dimensions located in the redirect URL comprising a character string.

19. The method of claim 16, wherein a first dimension of the one or more unknown dimensions comprises a first identifier of a polling question administered to the plurality of users, a second dimension of the one or more unknown dimensions comprises a second identifier of a first answer in response to the polling question, and a third dimension of the one or more unknown dimensions comprises a third identifier of a second answer in response to the polling question, wherein aggregating the user profile information of the plurality of users is based on the first dimension, the second dimension, and the third dimension, and wherein generating a user metrics report further comprises the first dimension, the second dimension, and the third dimension.

20. The method of claim 19, wherein the polling question, the first answer in response to the polling question, and the second answer in response to the polling question are unknown to the online system.

21. The method of claim 16, wherein a subset of the one or more unknown dimensions represent one or more unique information items unknown to the online system.

22. A method comprising:
receiving a plurality of redirect URLs from a plurality of users particular users of a social networking system, each redirect URL comprising a hash code for tracking one or more metrics for each user of the plurality of users defined by an external system, the hash code containing encoded information for values of the one or more metrics, where values of the one or more metrics of each hash code are obfuscated by the external system to be unknown to the social networking system, each user of the plurality of users being associated with one or more values of the one or more metrics that is different relative to at least one other user of the plurality of users;
extracting, by a processor, the hash code from each of the redirect URLs, each hash code being associated with a user metrics report requested by the external system;
determining, for each of the plurality of redirect URLs, user identifiers based at least in part on user devices associated with the plurality of redirect URLs, the user identifiers corresponding to user profiles with the social networking system;
storing each extracted hash code for each of the plurality of redirect URLs with a corresponding user identifier of the determined user identifiers;
determining, based on the user identifiers, user information from the user profiles for the plurality of users, the user profile information comprising one or more dimensions;
aggregating the user information by the extracted hash codes;
generating, by the processor, a user metrics report based on the one or more dimensions of user information and the extracted hash code; and
storing the user metrics report in the social networking system.

23. The method of claim 22, wherein extracting the hash code from the redirect URL is based on a format of the hash code received by the social networking system from the external system.

24. The method of claim 22, wherein a dimension of the user profile information comprises demographic information.

25. The method of claim 22, wherein a dimension of the user profile information comprises behavioral information on the social networking system.

26. The method of claim 22, wherein a dimension of the user profile information comprises political party affiliation information.

27. The method of claim 22, wherein a dimension of the user profile information comprises a declared interest in the social networking system.

28. The method of claim 22, wherein a dimension of the user profile information comprises social connection information.

29. The method of claim 22, wherein one or more user metrics reports were previously generated for a plurality of users in the social networking system, the method further comprising:
  responsive to a predetermined threshold number of user metrics reports being generated for a plurality of users in the social networking system, aggregating the plurality of user metrics reports for the plurality of users with the user metric report for the particular user into a combined user metrics report; and
  providing the combined user metrics report to the external system.

* * * * *